(12) United States Patent
Brockhaus

(10) Patent No.: US 6,564,612 B2
(45) Date of Patent: May 20, 2003

(54) MEASURING INSTRUMENT, AND METHOD FOR TESTING THE MEASURING OPERATION OF A MEASURING INSTRUMENT

(75) Inventor: Helmut Brockhaus, Dinslaken (DE)

(73) Assignee: Krohne Messtechnik GmbH & Co. KG (DE)

(*) Notice: Subject to any disclaimer, the term of this patent is extended or adjusted under 35 U.S.C. 154(b) by 0 days.

(21) Appl. No.: 10/006,501

(22) Filed: Dec. 3, 2001

(65) Prior Publication Data

US 2002/0112525 A1 Aug. 22, 2002

(51) Int. Cl.[7] .............................................. G01F 1/68
(52) U.S. Cl. ......................................................... 73/1.16
(58) Field of Search ........................................... 73/1.16

(56) References Cited

U.S. PATENT DOCUMENTS 5,285,673 A * 2/1994 Drexel et al. ................. 73/1.16
5,379,627 A * 1/1995 Bates, Jr. et al. ............ 73/1.16
6,227,031 B1 * 5/2001 Krajewski et al. ........... 73/1.16

FOREIGN PATENT DOCUMENTS

| DE | 196 06 826 A1 | 8/1997 |
| DE | 199 17 261 A1 | 11/2000 |

* cited by examiner

Primary Examiner—Robert Raevis
(74) Attorney, Agent, or Firm—Cesari & McKenna, LLP

(57) ABSTRACT

A measuring instrument, especially a flowmeter, whose measuring operation consists in the quantification of an output value as a function of an input value. According to the invention, the input value can be varied, the output value corresponding to a given input value can be measured, and a malfunction of the measuring operation of the measuring instrument can be detected on the basis of a deviation, beyond an established threshold value, of the output values measured at different input values, from the output value expected as a function of the relationship between the input value and the output value. The measuring instrument thus permits reliable and simple determination of a malfunction in the measuring operation by virtue of a self-test.

7 Claims, 2 Drawing Sheets

Figure 1:
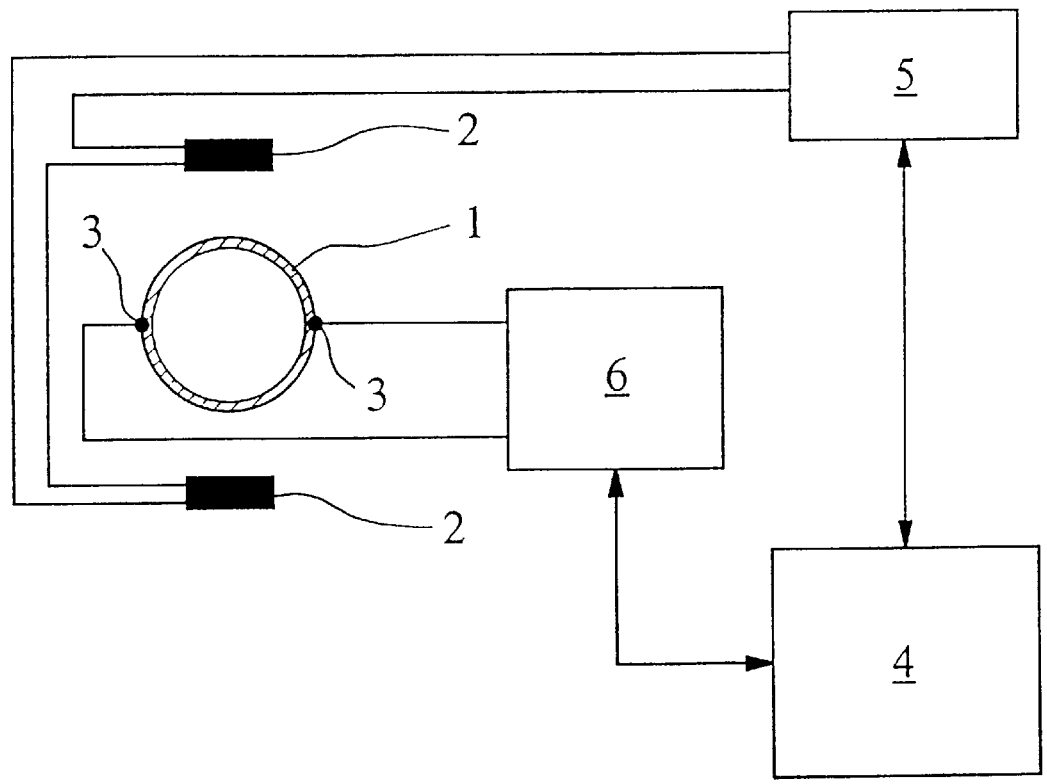

MEASURING INSTRUMENT, AND METHOD FOR TESTING THE MEASURING OPERATION OF A MEASURING INSTRUMENT

This invention relates to a measuring instrument, and in particular to a flowmeter, whose measuring operation, i.e. the quantitative determination of a given variable, serves to quantify an output value as a function of and with reference to a known input value. The invention further pertains to a method for testing the functional performance, i.e. the measuring operation, of a measuring instrument, especially that of a flowmeter whose measuring operation i.e. its determination of a measured value, consists in the quantification of an output variable as a function of a known input value.

In this case, the term input value refers to a value generally generated within the measuring instrument and employed in the determination of a measured variable on the basis of the interactive relationship between the input value and the measured variable. It is this interactive relationship which generates the measured variable, i.e. the output value. One example intended to illustrate the aforementioned interrelationship between measured variable, input value and output value is the determination of the flow rate of a fluid moving through a pipeline, using a magnetoinductive flowmeter. In the case of such a magnetoinductive flowmeter, a magnetic field is generated providing the input value. The latter interacts with the measured variable, that being the flow rate of the moving fluid, inducing in the flowing fluid a voltage that constitutes the output value.

It is an established practice to subject measuring instruments to a so-called self-test before or during the measuring operation. A self-test of that nature may serve to determine whether all the components of the measuring instrument are fully operational and also whether the measuring operation itself is properly executed. When the result of such a self-test is positive, meaning that there is no malfunction within the measuring instrument or in the measuring operation, one is assured that, within established tolerances of course, the measured values obtained with the measuring instrument reflect actual, true values.

For example, as the data are entered, this type of self-test includes plausibility verification of the setpoint values. Entries outside the permissible range, rather than being accepted, are rejected. Independent of this verification of the setpoint values at the time of the data entry, the data which are computationally derived from the setpoint values and which directly control the functional operation of the measuring instrument, are once more examined for their permissible limits. This examination takes place prior to the measuring operation, triggering in the event of a setpoint-related error a message such as "Fatal Error" and preventing the measuring operation from being executed. For example, it is possible to test individual components and modules of the measuring instrument for their functional performance for instance by impedance measurements or by measuring their ohmic resistance or their conductivity.

These prior-art self-testing capabilities of measuring instruments notwithstanding, there remains a need for additional self-testing procedures which allow an even more accurate determination of whether there is a malfunction in the measuring operation or in the measuring instrument itself. In particular, there may be cases where individual components of the measuring instrument deviate only slightly from their setpoint values, causing a self-test to suggest completely proper functionality of each such component, and yet, as these components interact, the resulting measuring operation may be flawed and may not necessarily ensure the specified accuracy of the measured values.

It is therefore the objective of this invention to provide a measuring instrument, and a method for testing the functional performance of such a measuring instrument, which during the ongoing measuring operation of the measuring instrument permit in simple fashion a very precise and accurate detection of any malfunctions.

The measuring instrument according to the invention as outlined above and designed to achieve this objective is characterized in that the input value is variable, that the output value which corresponds to any given input value can be measured, and that on the basis of any threshold-exceeding deviation of the output value, measured in relation to different input values, from the output value that is expected as a function of the relationship between it and the input value, a malfunction in the measuring operation is detectable. Thus, the invention is based on the use of the essentially known functional relationship between the input value and the output value, fundamentally underlying the measuring operation, for testing that measuring operation. In the simplest case, this interrelationship between the input value and the output value is a linear function, permitting the detection of a malfunction in the measuring operation of the measuring instrument simply by virtue of a deviation of the output values, derived from mutually different input values, by more than a certain threshold value from a linear pattern.

The invention provides for the input value to be varied. This means that the measuring operation employs at least two time-differentiated input values. In a preferred implementation of the invention, the input value can be varied in terms of its amplitude on a time and preferably cyclical basis. However, the invention is not limited to a time-based variation of the amplitude of the input value but is similarly applicable in the form of a variation of other suitable parameters of the input value.

In comparing the actually measured output value with the output value expected based on the corresponding input value, any deviation can be separately used for test purposes. However, in a preferred implementational version of the invention, the deviation can be averaged over several values, preferably at least 100. This prevents individual "stray components" of the measured output value from erroneously suggesting a malfunction in the measuring operation. As an alternative it is also possible to subject the measured deviation to low-pass filtering. In another preferred implementation of the invention, more complicated measuring conditions due for instance to an augmented standard deviation relative to the measured actual deviation are addressed by an increase in the number of the values over which the deviation can be averaged. This latter approach is equally useful in the case of strongly fluctuating measured values for avoiding the erroneous indication of a malfunction in the measuring operation.

The threshold value which, when exceeded, allows the detection of a measuring malfunction of the measuring instrument, can be established in different ways, one example being a constant absolute value. However, in a preferred implementation of this invention, the threshold value is established as a percentage of the rated measuring range, i.e. of full scale, for the output value. In this fashion it is possible, by one single definition of the threshold value as a percentage of full scale for the output value, to arrive at a setting for the measuring instrument which can be used for all selectable measuring ranges of the measuring instrument.

In this context, according to a particularly preferred embodiment of the invention, the percentage of full scale for the output value is 1% or less.

The detection of a measuring malfunction of the measuring instrument can prompt different courses of action, especially a stoppage of the measuring operation of the measuring instrument, since obviously no reliable measuring results can be obtained any longer. However, in a preferred implementation of this invention the detection of a measuring malfunction can trigger an optical or acoustic alarm signal.

This invention is fundamentally suitable for any measuring instrument which must meet the above-mentioned requirements, involving a measuring operation in which an output value that is a function of an input value is measured for the determination of an object value to be measured. The method according to this invention is particularly useful, however, when applied in magnetoinductive flowmeters for measuring the flow rate of a conductive fluid through a pipeline, where the input value is a field current fed into the field coils of the magnetoinductive flowmeter, the output value is a voltage that is induced in the conductive fluid and retrievable at the test electrodes, and a malfunction of the measuring operation of the magnetoinductive flowmeter can be detected when the deviation of the induced voltage measured at different field currents from a linear voltage curve is in excess of the established threshold value.

The method of this invention, based on the above-described methodology applied in the testing of the measuring operation of a measuring instrument and designed to achieve the stated objective, is characterized in that the input value is varied, the output value corresponding to a given input value is measured and the threshold-exceeding deviation of the measured output values, derived from different input values, from the output value expected as a function of the interrelation between the latter and the input value, is used to determine a malfunction of the measuring operation.

Preferred versions of the method according to this invention for testing the measuring operation of a measuring instrument are adapted in analogous fashion to the above-described implementation versions of the measuring instrument of this invention.

Figure 2:
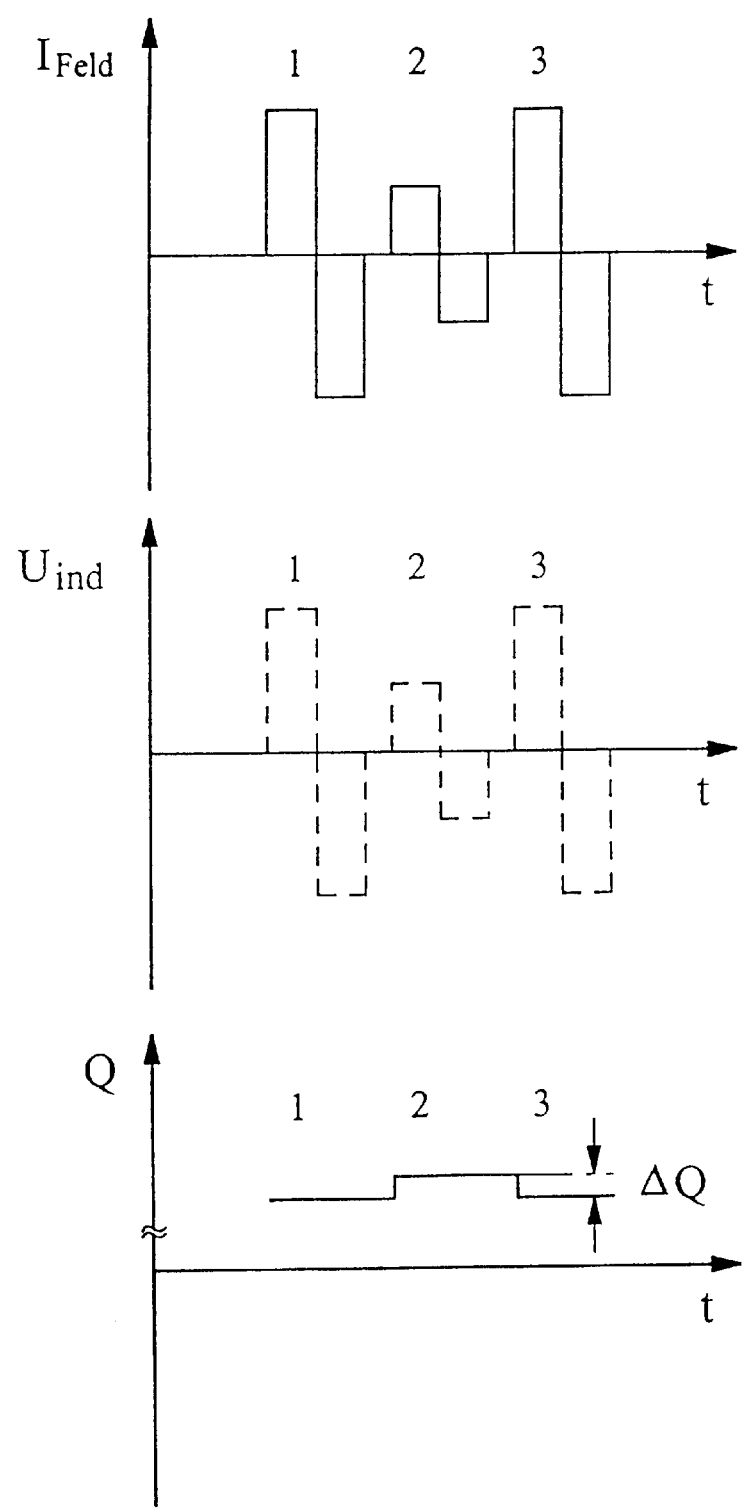

There are numerous ways to configure the measuring instrument according to this invention and to implement and further enhance the method disclosed. In this connection, reference is made to the dependent claims and to the following detailed description of a preferred embodiment of the invention with the aid of the drawings, in which:

FIG. 1 is a schematic diagram showing the layout of a magnetoinductive flowmeter according to a preferred embodiment of the invention, and FIG. 2 is a diagram showing the patterns of the input value, the output value and the detected deviation of the measured output value from the expected output value.

The following describes a preferred embodiment of a magnetoinductive flowmeter according to the invention and a preferred method for testing the measuring operation of a magnetoinductive flowmeter. The diagram in FIG. 1 illustrates the configuration of the magnetoinductive flowmeter according to the preferred embodiment of the invention. The magnetoinductive flowmeter includes a conduit 1 through which passes a conductive fluid, not shown. Two field coils 2 serve to generate a magnetic field which permeates the conduit 1 and thus the fluid flowing through the conduit 1. In the area in which it is permeated by the magnetic field, the conduit 1 is provided with two test electrodes 3 by means of which a voltage induced in the fluid can be sampled.

The fundamental concept of a magnetoinductive flowmeter for moving fluids dates back to Faraday who as early as in 1832 proposed the application of the principle of electrodynamic induction for measuring flow rates. According to Faraday's law of induction, an electrical field intensity is generated in a fluid that flows through a magnetic field and contains charge carriers, in a direction perpendicular to the direction of the flow and to the magnetic field. The magnetoinductive flowmeter takes advantage of that law insofar as the magnet, consisting of the field coils 2, generates in the conduit 1 a magnetic field which extends perpendicular to the direction of the flow. Within that magnetic field, each volume element of the fluid traveling through the magnetic field contributes the field intensity that is generated in each such volume element to the measuring voltage collected via the test electrodes 3. In conventional magnetoinductive flowmeters, the test electrodes 3 are designed to make galvanic or capacitive contact with the moving fluid. A salient feature of magnetoinductive flowmeters is the proportionality between the measuring voltage and the flow rate averaged across the diameter of the conduit 1. In addition, the functional relationship between the field current for the field coils 2, i.e. for the magnetic field generated by the field coils 2, and the voltage induced in the conductive fluid is essentially linear.

Accordingly, the input values for the measuring operation are constituted indirectly by the field current and directly by the magnetic field. The measured output value is the voltage induced in the conductive fluid and taken off at the two test electrodes 3. As indicated above, there is proportionality between the magnetic field and the induced voltage, as a result of which the voltage induced in the conductive fluid and constituting the output value follows a linear voltage curve as a function of the input values in the form of different magnetic field intensities or field currents.

The magnetoinductive flowmeter according to the preferred embodiment of this invention incorporates a microcontroller 4, a field-coil power supply 5 and an analog-to-digital converter 6. The microcontroller 4 handles the overall control of the magnetoinductive flowmeter as well as the measuring operation of the latter while the field-coil power supply 5 feeds the necessary field current to the field coils 2. The A/D converter 6, positioned between the test electrodes 3 and the microcontroller 4, receives as its input signal the voltage induced in the conductive fluid and collected at the test electrodes 3, then outputs to the microcontroller 4 a digitized value proportional to that voltage. The field-coil power supply 5 on its part connects to the microcontroller 4 for the purpose of controlling and regulating the field-coil power supply 5, meaning the field current fed by the power supply 5 to the field coils 2, or, if the field current is controlled and regulated within the field-current power supply 5 itself, the transmission of the respective field current potential.

As is indicated in the diagram of FIG. 2, the field current employed in the measuring operation is an alternating direct current. Between every two cycles of the field current $I_{field}$ with a full amplitude, at 100 mA in the example shown and identified in FIG. 2 as 1 and 3, a cycle, referred to as 2 in FIG. 2 and having only half the amplitude, i.e. 50 mA, is periodically interpolated for instance every 5 seconds. Since the field current is reduced to one half, the voltage $U_{ind}$ induced in the electrically conductive fluid in that cycle will likewise be reduced to one half. Given that the equation for the flow rate Q is $$Q = \frac{U_{ind}}{I_{field}} constant$$

meaning that the induced voltage is a linear function of the field current, one would in theory expect an unchanged flow rate Q to be of an identical value in cycle 2 as in cycles 1 and 3. In reality, there is usually a difference Q between the flow rate measured in cycle 2 and the flow rates measured in cycles 1 and 3 which difference Q is generally attributable to dimensional tolerances or malfunctions of the individual components of the magnetoinductive flowmeter.

While according to the preferred embodiment of the invention described above, the amplitude of the field current and, consequently, the intensity of the magnetic field is reduced by 50%, it is equally possible to periodically change the field current, and with it the magnetic field, in various other ways. In particular, the field current can be periodically reduced and periodically increased, with any such reduction and increase preferably being on the order of at least 20%.

For the functional operation of this invention, it is not even necessary that the changes of the field current and thus of the magnetic field be periodic. It is merely for the purpose of simplified implementation that in the case of the preferred embodiment of the invention described above, the variation of the field current and, consequently, of the magnetic field takes place in periodic i.e. cyclical, fashion and is maintained at a multiple integer of the half-cycle of the field current. The settings for the self-test function are preferably selected in a manner whereby the variation is maintained over two or three half-cycles of the field current.

In the preferred embodiment of the invention discussed above, the test function in the form of the interpolation of a cycle with a reduced-amplitude field current which in the example is half the amplitude, takes place every 5 seconds. The difference Q of the flow rates measured is averaged over 100 such test cycles. If it turns out that this averaged value is greater than 1% of full scale for the flow rate Q, the magnetoinductive flowmeter will send a "Linearity Alarm" signal. According to the embodiment of this invention as described above, this warning may be in the form of a visual and/or audio alarm. The alarm signals one of the following errors: Nonlinearity of the A/D converter 6, nonlinearity in the circuitry of the field coils 2, a defect in the field coils 2 or in the lining of the conduit 1 or in the test electrodes 3, an incorrect setting of the calibration values, and/or a zero-point deviation of the A/D converter 6. It follows that in the preferred embodiment of this invention, the entire measuring electronics including the test electrodes 3, the field-coil power supply 5 and the A/D converter 6 are subjected to a self-test.

The relationship between the field current fed to the field coils 2 and the magnetic field generated by the field coils 2 is essentially linear. It is possible, however, that under certain circumstances that relationship shows some nonlinearities. Therefore, the preferred embodiment of this invention includes a calibration of the variation of the field current, in this case of its reduction to one half. The magnetoinductive flowmeter manufactured in accordance with the preferred embodiment of this invention is factory-calibrated.

Apart from the above-described averaging over at least 100 test points, preferably conducted on a sliding-average basis, it is also possible to process the test results via low-pass filtering in the microcontroller 4. The microcontroller 4 also determines the standard deviation of the test points, so that in the event of significantly uncertain test results, i.e. in the case of a major standard deviation of the test points, the number of test points to be averaged can be increased automatically, whereby the triggering of false alarms is avoided.

What is claimed is:

1. A method for testing the measuring operation of a magnetoinductive flow meter for measuring the flow rate of a conductive fluid through a conduit, the magnetoinductive flow meter comprising field coils and tests electrodes, the method comprising the steps of:

feeding the field coils with a field current;

varying the amplitude of the field current in time;

collecting a voltage induced in the conductive fluid at the test electrodes, and detecting a malfunction in the measuring operation of the magnetoinductive flow meter when the deviation of the induced voltage collected at the test electrodes at different field currents deviates from a linear voltage curve by more than a threshold value.

2. The method as in claim 1, including the additional step of varying the field current periodically.

3. The method as in claim 1 or 2, including the additional step of varying the field current by at least 20%.

4. The method as in claim 1 or 2, including the additional step of averaging the deviation over several values.

5. The method as in claim 4, including the additional steps of determining the standard deviation of the measured deviation, and increasing the number of values over which the deviation is averaged if the standard deviation exceeds a predefined value.

6. The method as in claim 1 or 2, including the additional step of establishing the threshold value as a percentage of the measured quantity of the output value.

7. The method as in claim 6, including the additional step of triggering a visual or audio alarm when a malfunction in the measuring operation is detected.

* * * * *